United States Patent [19]

Horn

[11] 3,720,408

[45] March 13, 1973

[54] APPARATUS FOR SEPARATING AND FEEDING EXPOSED FILM SHEETS FROM A MAGAZINE INTO A FILM PROCESSOR

[75] Inventor: Robert F. Horn, Rochester, N.Y.

[73] Assignee: Eastman Kodak Company, Rochester, N.Y.

[22] Filed: June 10, 1971

[21] Appl. No.: 151,675

[52] U.S. Cl. .................... 271/18 R, 95/90, 221/279, 271/61, 271/62 R
[51] Int. Cl. ............................................. B65h 3/00
[58] Field of Search ............. 271/18, 60, 62 R, 61, 8; 221/279; 95/90; 193/35 A, 32

[56] References Cited

UNITED STATES PATENTS

| | | | |
|---|---|---|---|
| 388,369 | 8/1888 | Morse et al. | 221/279 X |
| 1,325,167 | 12/1919 | Olson | 193/35 A X |
| 3,287,012 | 11/1966 | Woodcock | 271/18 R |
| 3,080,163 | 3/1963 | Pasquinelli | 271/60 |
| 3,265,383 | 8/1966 | Shute | 271/20 X |
| 3,276,769 | 10/1966 | Kallenberg | 95/90 X |
| 3,026,108 | 3/1962 | Swing | 271/18 R |

Primary Examiner—Evon C. Blunk
Assistant Examiner—Bruce H. Stoner, Jr.
Attorney—W. H. J. Kline and James A. Smith

[57] ABSTRACT

Apparatus for separating and singly delivering exposed film sheets from a film magazine into a film processor includes means for coupling the film magazine to the processor in a substantially light-proof manner, a guide for feeding the film sheets from the film magazine along a predetermined path to the processor, an abutment disposed to be engaged by the bottommost sheet of film while allowing the top sheet to move toward the processor, and a lift member for raising the engaged film sheet above the abutment for gravity feed to the processor.

8 Claims, 8 Drawing Figures

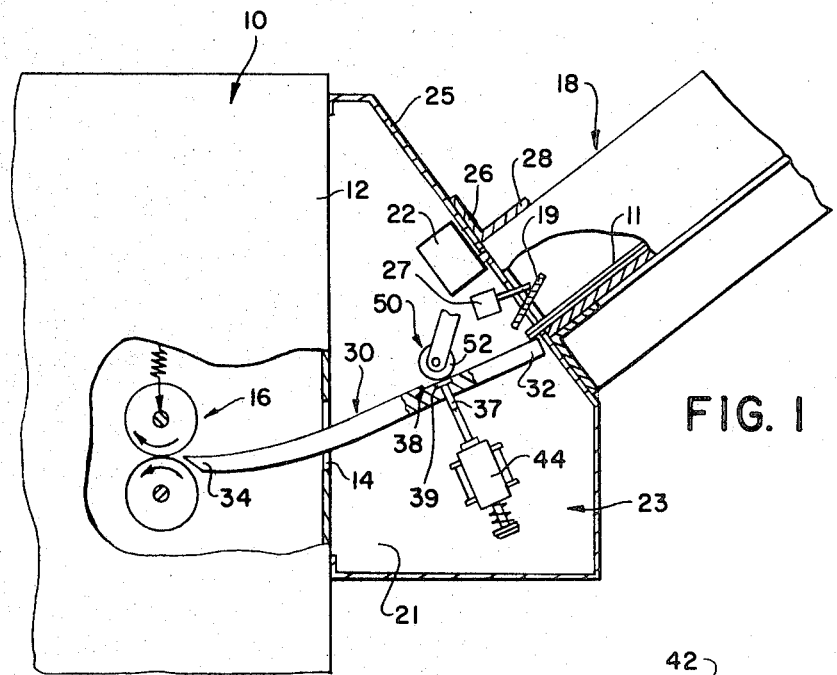
FIG. 1
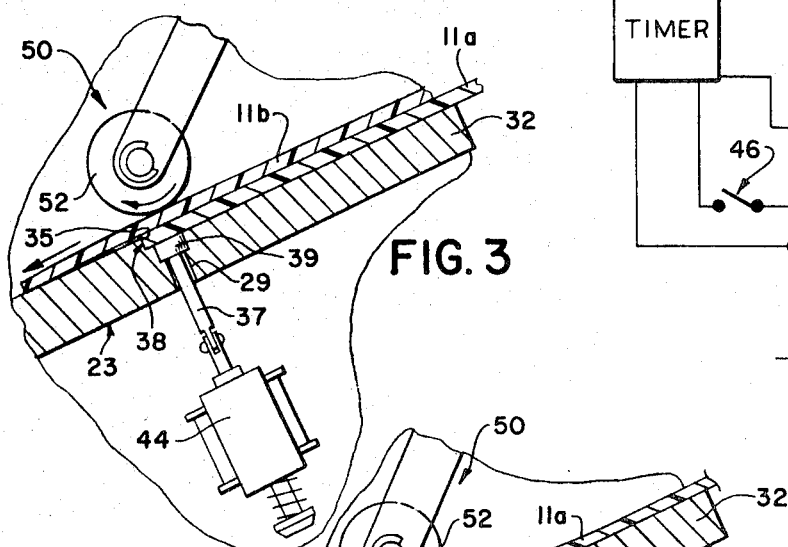
FIG. 3
FIG. 2
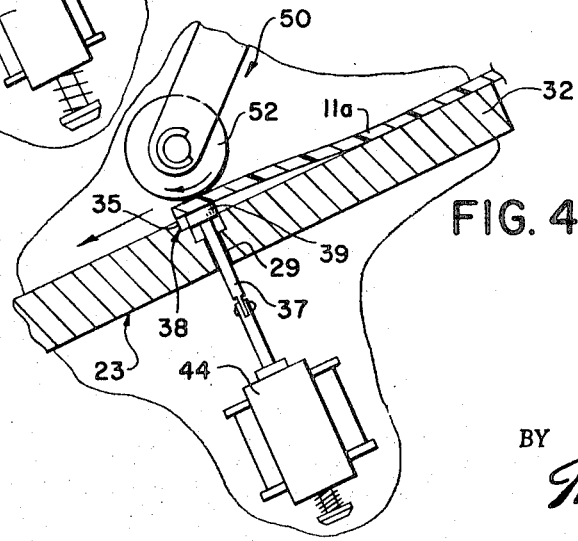
FIG. 4
ROBERT F. HORN
INVENTOR.
BY *James A. Smith*
*W. H. J. Kline*
ATTORNEYS

ROBERT F. HORN
INVENTOR.

BY James A. Smith
W. W. J. Kline
ATTORNEYS

APPARATUS FOR SEPARATING AND FEEDING EXPOSED FILM SHEETS FROM A MAGAZINE INTO A FILM PROCESSOR

BACKGROUND OF THE INVENTION

1. Field of the Invention

This invention relates to apparatus for unloading exposed sheet film, such as X-ray film, from a container such as a film magazine, and more particularly to such apparatus for separating and singly delivering the film sheets into a film processor without darkroom facilities.

2. Description of the Prior Art

The ability to discharge exposed X-ray film from a magazine into a processor under white-light conditions has the advantage that it eliminates the added steps, and time required to transport the exposed film to a darkroom to be removed from the magazine for processing. Apparatus for performing this function are known in the art. For example, it is known to attach a magazine having a light-proof slit for inserting and removing the film to a processor having corrugated rollers to engage a tab of film extending from the slit, and roll the film into the processor. Another known device adapted to unload a magazine of the type having a hinged lid, includes grippers disposed to grip an edge of the film after opening the lid, and move the film onto rollers for feeding into the processor. However, such prior art devices do not have the facility to separate a plurality of film sheets from the magazine, and to singly deliver the film sheets into the processor.

SUMMARY OF THE INVENTION

It is therefore an object of the invention to provide an improved apparatus for removing exposed film from a container such as a film magazine and to feed the film into a processor in day light conditions.

In accordance with the invention, apparatus is provided for removing at least two film sheets from a film magazine and singly delivering the film sheets to a film processor. The apparatus includes means for coupling the magazine to the processor in a substantially light-proof manner and means for moving the film sheets from the magazine along a predetermined path to the processor. Means are disposed along the predetermined path to be engaged by the leading edge of at least one film sheet, and means are provided for changing the position of the leading edge of such sheet to permit the film sheet to feed into the processor. In one embodiment of the invention, the magazine is coupled to the processor by a substantially light-proof housing including a guide member establishing a predetermined path relative to the film magazine and the processor for guiding the film sheets from the magazine to the processor. An abutment is disposed on the guide member to be engaged by, and to hold the bottommost film sheet while allowing the top sheet of film to move along the guide member. A lift member is movable relative to the abutment to engage the bottom surface of a film sheet engaging the abutment, to lift the film sheet over the abutment to permit gravity feed into the processor.

In a second embodiment of the invention, the abutment is of sufficient height to engage and retain a plurality of stacked film sheets. The lift member is coupled to a cam surface including means to rotate the cam a predetermined amount to raise the lift member to thereby raise the film stack an amount approximately equal to the thickness of one film sheet, thereby raising one film sheet at a time over the abutment, to be fed into the processor.

BRIEF DESCRIPTION OF THE DRAWING

Other objects and advantages of the invention will become apparent from the following detailed description taken in connection with the accompanying drawings wherein:

FIG. 1 is a generally schematic side view of apparatus in accordance with one embodiment of the invention and showing a film magazine interconnected to a processor in position to gravity feed film into the processor;

FIG. 2 is a schematic of a suitable electrical circuit for use with the apparatus of FIG. 1;

FIG. 3 is an enlarged view of the abutment and lift member of FIG. 1, showing a sheet engaging the abutment, and a sheet moving down the guide member;

FIG. 4 is an enlarged side view showing the lift member of FIGS. 1 and 3 raising the leading edge of a film sheet above the abutment;

DESCRIPTION OF THE PREFERRED EMBODIMENT

Figure 5:
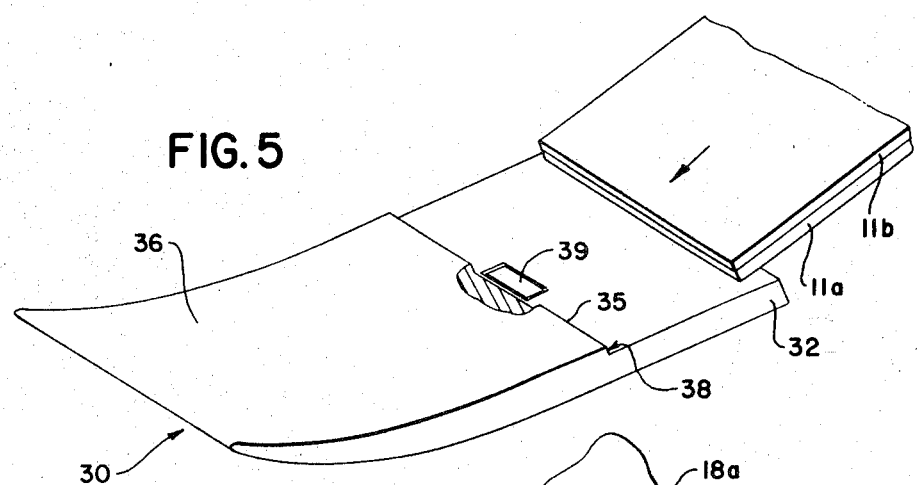
FIG. 5 is an enlarged view in detail of the guide member shown in FIG. 1 with the film sheets positioned to move down the guide member.

Referring now to FIG. 1, apparatus in accordance with one illustrative embodiment of the invention is shown, for processing exposed X-ray film sheets 11 without darkroom facilities. The apparatus shown in connection with an X-ray film processor 10, such as, for example, a Kodak RP-X-OMAT Processor, which is shown in part only. The processor 10 includes a back wall surface 12 having a film feed entrance port 14, wherein a film receiving station locates a pair of rollers 16. The rollers 16 may include a driven roller and an idler roller, which are disposed to accept an exposed film sheet 11 as it moves into the processor entrance port 14, and to move it into a processing solution within the processor.

Also shown in FIG. 1 is an X-ray film receiver magazine or container 18, which is positioned at a holding station adjacent to the entrance port 14. The magazine 18 is of conventional construction, which may include a light-tight, actuatable film gate 19 to discharge one or more film sheets 11. When the magazine 18 is positioned as shown in FIG. 1, the film sheets 11 are in a stacked relationship to one another and are aligned relative to the processor entrance 14.

A housing 23 is provided for coupling the magazine 18 to the processor 10, having one side 21 engaging the processor back wall 12 to cover the processor entrance port 14 in a substantially light-tight manner, and an adjacent side 25 provided with an adapter 26 for receiving the magazine 18. The housing may be provided with a microswitch 22, or other suitable device, to detect a proper seating of the magazine 18 into the adapter 26. Upon a proper seat, the microswitch 22 actuates a solenoid 27, disposed within the housing 23, to open the film gate 19. The adapter 26 may take the form of a rectangular receptacle having an extension 28 for receiving and supporting the magazine 18, and for providing a substantially light-tight coupling of the magazine 18 to the housing 23. The embodiment of the invention shown, utilizes gravity feed to unload the magazine 18. More particularly, the adapter 26 is positioned above and at an angle to the processor entrance port 14, so that when the film gate 19 is opened, the film sheets 11 will slide out of the magazine 18, toward the processor port 14, in a stacked relationship to one another.

As further shown in FIG. 1, the housing 23 includes a guide member 30, which is positioned inclined relative to the magazine 18 and the entrance port 14. One end 32 of the guide member 30 is positioned adjacent to the film port 19, and accepts the film sheets 11 as they slide out of the magazine 18. The other end 34 is positioned adjacent to the rollers 16, and is slightly arcuate so that the guide member 30 terminates in a surface positioned in a horizontal plane adjacent to the rollers 16, whereby a sheet of film will initially move down the guide member 30 at an angle to the horizontal plane, and then move horizontally between the rollers 16. As shown by FIG. 5, the guide member 30 is of the approximate width of a sheet of film, and has a substantially flat upper surface 36 which defines a film stop or abutment 38, extending transverse to the upper surface 36. The abutment 38 may take the form of, for example, a step having height slightly less than the thickness of a sheet of film (i.e., if the film sheet is 0.007 inch, the step may be approximately 0.006 inch). The illustrated embodiment discloses apparatus adapted for processing two sheets of film; therefore, only one such abutment 38 is shown in FIGS. 1–5. However, it will be appreciated by one skilled in the art that the apparatus may be adapted to accept and process film from a magazine 18 containing more than two film sheets 11, by adding additional abutments 38 placed transverse to, and spaced along the guide member 30.

Associated with the abutment 38 is a lift member 37, as shown in FIGS. 1, 3, and 4, that may take the form of a piston-like element having a top, film engaging portion 39. The lift member 37 is received in a passage 29 in the guide member 30, and is positioned adjacent to the bottom of the abutment 38. The top portion 39 of the lift member 37, may be substantially even with, or below the surface 36, as shown in FIG. 5. As shown in FIGS. 3 and 4, the lift member 37 is disposed to be raised to a position wherein the top portion 39 engages the leading edge of a film sheet 11a, so that as the lift member 37 is raised, the top portion 39 engages the film sheet 11a, and raises it above a top edge 35 of the abutment 38. One such lift member 37 would be provided with each abutment 38, when using the apparatus to process more than two film sheets from the magazine 18. To actuate the lift member 37, there is provided a solenoid 44, or other suitable device, which may be coupled to the lift member 37 by conventional means.

The solenoid 44 may be actuated to raise the lift member 37, by means of an electrical circuit, to be discussed later, in response to manual or automatic operation in accordance with the time cycle of the film processor 10. If the film sheets 11 attempt to override the abutment 38, during the initial movement down the guide member 30, a pivotal holddown member 50, such as shown in FIGS. 1, 3, and 4, may be provided. The holddown member 50 may be positioned as an idler, and may have a roller 52 that contacts the film sheets 11 but will rotate to allow a film sheet 11b to feed down the guide member 30.

A suitable circuit 40 for use with the apparatus disclosed is illustrated in FIG. 2 and includes a power source 41 coupled to a timer 42, a switch 43 and the solenoid 44, to permit actuation of the film lift 37 either manually, or automatically on a timed basis. The switch 43 may be a spring loaded, manual switch, accessible from the exterior of the housing 23, which when closed is effective to connect the power source 41 and solenoid 44 in series, to thereby actuate the lift member 37. Another switch 46 is provided for coupling the power source 41 to the timer 42 which may be arranged to operatively engage the solenoid 44 in accordance with the time cycle of the film processor 10. The microswitch 22 is connected in series with the power source 41 and the solenoid 27, and energizes the solenoid 27 to open the film gate 19 when the magazine 18 is properly seated in the adapter 26.

Having described the details of the apparatus, its use will be described in connection with the processing of two exposed film sheets 11, without the aid of darkroom facilities. At the outset, the magazine 18 containing two exposed film sheets 11 is removed from an exposing device and is inserted into the adapter 26. When the magazine 18 is properly seated in the adapter 26, the microswitch 22 actuates the solenoid 27 to open the film gate 19. The opening of the film gate 19 permits both film sheets 11 to slide out of the magazine 18, under the influence of gravity, onto the guide member 30. As shown by FIG. 2, the two film sheets 11 move onto the guide member 30 in a stacked relationship to one another, and as further shown in FIG. 3, the film sheets 11 slide down the guide member 30 to a position where the bottom film sheet 11a engages the abutment 38. As the bottom film sheet 11a engages the abutment 38 and is retained, the top film sheet 11b continues to slide down the guide member 30, and moves into the processor feed entrance port 14 and between the rollers 17 (not shown in FIGS. 3 and 4). As illustrated in FIG. 4, the solenoid 44 is actuated (after a predetermined time interval based upon the processing speed), either manually by operating the switch 43, or automatically by the timing mechanism 42 if switch 46 is closed, to raise the lift member 37 to engage the leading edge of the film sheet 11a, and raise it above the top edge 35 of the abutment 38, to permit gravity feed of the film sheet 11a into the processor.

Figure 6:
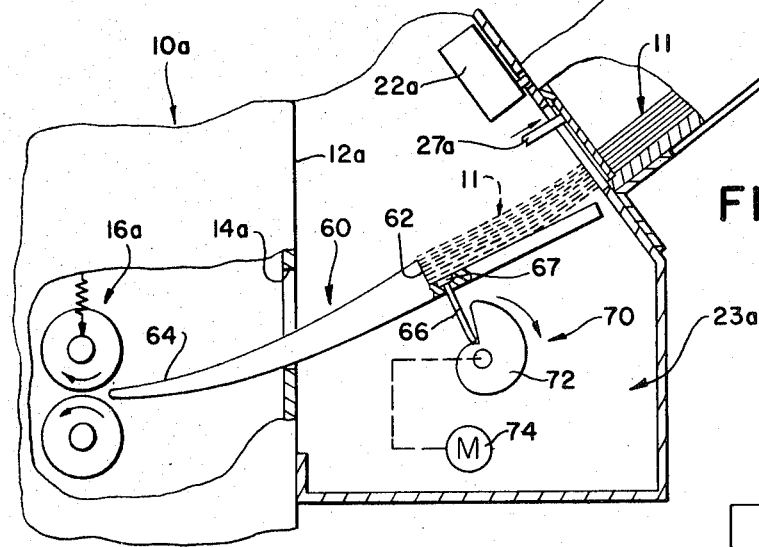
FIG. 6 is an elevational view of an alternate embodiment of the apparatus of FIGS. 1–4, adapted to accommodate a plurality of film sheets.
Figure 7:
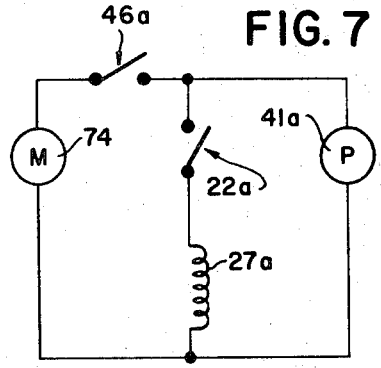
FIG. 7 is a schematic diagram of a suitable electrical circuit arrangement for use with the apparatus of FIG. 6.
Figure 8:
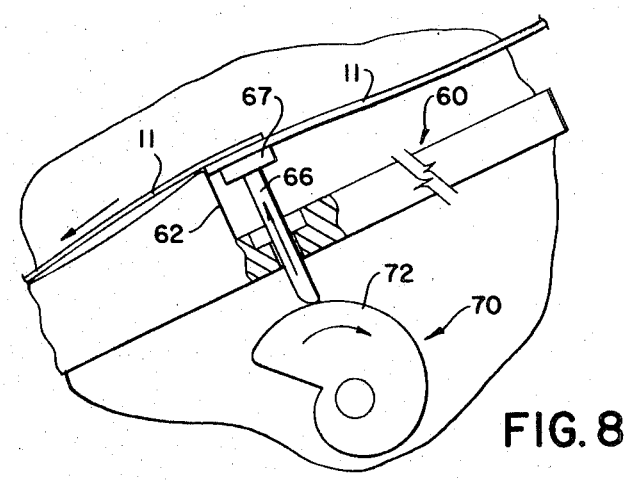
FIG. 8 is an enlarged view of the cam mechanism and lift member of FIG. 6, operating to raise the film over the abutment to be fed to the processor.

FIGS. 6–8 shown another embodiment of the invention which is particularly useful with magazines containing more than two film sheets. In FIGS. 6–8, parts corresponding to those shown in FIGS. 1–5 have been given like reference numerals followed by the suffix a. In this embodiment, a magazine 18a, in this case suitable to hold a plurality of exposed film sheets 11, is coupled to the processor wall 12a by a housing 23a. A guide member 60 is provided within the housing 23a, disposed between the magazine 18a and the processor entrance port 14a, for guiding the exposed film sheets from the magazine 18a to a pair of rollers 16a, located within the processor entrance port 14a. The guide member 60 defines an abutment 62, extending transverse to an upper surface 64, of the guide number 60, which has sufficient height to retain a plurality of film sheets in a stacked relationship to one another as indicated in FIG. 6. A lift member 66, having a film engaging flange 67 recessed in the guide member 60, is disposed adjacent to the abutment 60 and adapted to be raised a vertical distance from the surface 64 to cause the flange 67 to engage and vertically displace the stacked film sheets 11. The lift member 66 may be raised by means of a cam mechanism 70, which may include a cam surface 72 rotatable by a motor 74. The motor 74 may be for example, a constant speed motor capable of a controlled rate of turning. The rotation of the motor 74 may be controlled by a circuit, such as for example that shown in FIG. 7, which is adapted to supply current to the motor 74 from a source 41a for a controlled rate of turn of the motor 74 for a unit time. The motor 74 turns the cam surface 72 to raise the lift member 66 a vertical distance sufficient to move the upper most sheet above the abutment 62. As the lift member 66 is raised, the film sheets 11 are sequentially, one at a time, moved above the abutment 62, in accordance with the processing cycle time of the processing unit 10. The operation of the lift member 66, and cam surface 72, may be more fully understood by referring to FIGS. 7 and 8. Initially, the switch 22a is closed by the seating of the magazine 18a into the adaptor 26a, and the solenoid 27a is actuated to release the film sheets 11 to slide down the guide member 60 to the abutment 62. The switch 46a is shown as a manual switch, when when closed couples the power source 41a to the motor 74. It is to be understood, however, that the switch 46a may be automatically actuated as the magazine 18a is seated into the adaptor 26. As the motor 74 rotates the cam surface 72 in a clockwise direction, the lift member 66 is raised vertically, thereby sequentially lifting the film sheets 11 above the top edge of the abutment 62, to permit gravity feed of the film sheets 11 into the processor 10a.

The arrangements make possible the use of an apparatus wherein exposed sheet film can be singularly fed into a film processor and processed without the use of a darkroom facility, thereby shortening the time between exposure and film reading.

I claim:

1. Apparatus for removing exposed film sheets from a film holder having an actuatable film gate for removing the film sheets and for separating and singly delivering the exposed film sheets into a processor by gravity feed, said apparatus comprising:
   a. means interconnecting the film holder to the processor in a substantially light-proof manner, for positioning the film holder relative to the processor to facilitate gravity feed of the film sheets from the film holder to the processor;
   b. means defining a predetermined path between the film holder and the processor along which the film sheets move to the processor;
   c. stop means positioned relative to said means for defining a predetermined path to be engaged by the film sheets as they move along said predetermined path; and
   d. means to singly disengage the film sheets from said stop means for permitting movement of the film sheets by force of gravity along the predetermined path into the processor.

2. Apparatus for removing at least two stacked exposed film sheets from a magazine having an actuatable film gate for removing the film sheets, and separating and singly delivering the film sheets into a film processor, said apparatus comprising:
   a. a housing for interconnecting the magazine to the processor in a substantially light-proof manner;
   b. guide means disposed between the magazine and the processor for permitting movement of the film sheets from the magazine along said guide means to the processor, said guide means being disposed relative to the magazine and the processor to permit gravity feed of the film sheets to the processor;
   c. an abutment disposed on said guide means, and having a height of approximately the thickness of a sheet of film, for engaging the bottommost sheet of film as the film sheets move along said guide means, while allowing the top film sheet to continue to move along said guide means to the processor;
   d. means for changing the relative position of the leading edge of the engaged film sheet relative to said abutment to permit the bottommost film sheet to move along said guide means to the processor.

3. Apparatus as claimed in claim 2 wherein sensing means are provided for sensing the coupling of the magazine to the housing, and initiating the movement of the film out of the magazine when the magazine is coupled to the housing.

4. Apparatus as claimed in claim 2 wherein means are disposed above the abutment for contacting the film sheets as they move down said guide member to force the film sheet to engage the abutment.

5. Apparatus as claimed in claim 2 wherein the means for changing the relative position of the leading edge of the bottommost sheet of film and said abutment comprises means disposed relative to said abutment for raising the leading edge of the film sheet above said abutment to permit the film sheet to be moved down said guide means by force of gravity.

6. Apparatus as claimed in claim 5 wherein said means for changing the relative position of the leading edge comprises a lift member disposed to be raised relative to said abutment to engage the bottom of the film sheet to raise the film sheet above said abutment, and means for actuating said lift member.

7. Apparatus for separating and singly delivering exposed film sheets into a processor by gravity feed, from a film holder containing a plurality of stacked exposed film sheets, the film holder having an actuatable film gate where the film sheets may be inserted or removed, said apparatus comprising:
   a. means interconnecting the film holder to the processor in a substantially light-proof manner, for positioning the film holder relative to the processor to facilitate gravity feed of the film sheets out of the film holder;

b. means defining a predetermined path between the film holder and the processor for directing the film sheets to the processor;
c. an abutment disposed relative to said means for defining said predetermined path, to be engaged by the stacked film sheets as they move by force of gravity along said predetermined path;
d. means for sequentially lifting the stack of film sheets a predetermined distance relative to said abutment to sequentially permit a single sheet of film to move along said predetermined path into the processor.

8. Apparatus as claimed in claim 7 wherein said lifting means comprises a lift member disposed relative to said sheet means for engaging the bottom of the stack of film sheets, including:
a. cam means disposed to engage said lift member;
b. motor means for driving said cam means at a preselected rate; and
c. means for engaging said motor to sequentially raise said lift member relative to said abutment to one at a time disengage the film sheets from said abutment to permit the film sheet to move along said guide means into the processor.

* * * * *